(12) United States Patent
Hamilton

(10) Patent No.: US 6,910,703 B1
(45) Date of Patent: Jun. 28, 2005

(54) SIMULATED MOTORCYCLE FUEL TANK BICYCLE ACCESSORY

(76) Inventor: Paul M. Hamilton, 1412 Lexington Ridge Dr., Lexington, MA (US) 02453

( * ) Notice: Subject to any disclaimer, the term of this patent is extended or adjusted under 35 U.S.C. 154(b) by 0 days.

(21) Appl. No.: 10/662,271

(22) Filed: Sep. 15, 2003

(51) Int. Cl.[7] .............................................. B62J 39/00
(52) U.S. Cl. ................................................. 280/288.4
(58) Field of Search ........................... 260/288.4, 828; 206/457; 220/562, 905; D12/114, 218

(56) References Cited

U.S. PATENT DOCUMENTS

| | | | | |
|---|---|---|---|---|
| 3,785,086 A | * | 1/1974 | Escobedo | 446/440 |
| 3,978,901 A | * | 9/1976 | Jones | 206/524.5 |
| 4,201,011 A | * | 5/1980 | Cook | 446/440 |
| 4,463,515 A | * | 8/1984 | Barlow et al. | 446/409 |
| D300,418 S | * | 3/1989 | Yamada et al. | D12/114 |
| 5,499,835 A | * | 3/1996 | Skirchak et al. | 280/293 |
| 5,505,493 A | * | 4/1996 | Camfield et al. | 280/828 |
| 5,658,050 A | * | 8/1997 | Lorbiecki | 297/452.41 |
| 5,669,660 A | * | 9/1997 | Matthies | 297/195.13 |
| 5,851,017 A | * | 12/1998 | Eden | 280/201 |
| 6,036,046 A | * | 3/2000 | Brambach | 220/564 |

* cited by examiner

Primary Examiner—Lesley D. Morris
Assistant Examiner—L. Lum
(74) Attorney, Agent, or Firm—William Nitkin

(57) ABSTRACT

An accessory for a bicycle of the type having a top tube, such accessory being an inflatable simulated motorcycle fuel tank which is attachable to such top tube. The simulated motorcycle fuel tank can be provided in a variety of shapes and configurations with decorations and insignia thereon.

5 Claims, 3 Drawing Sheets

SIMULATED MOTORCYCLE FUEL TANK BICYCLE ACCESSORY

BACKGROUND OF THE INVENTION

1. Field of the Invention

The device of this invention resides in the area of bicycles and more particularly relates to a bicycle accessory in the form of an inflatable simulated fuel tank for attachment to a bicycle to make the bicycle appear to be a motorcycle.

2. History of the Prior Art

The idea of putting simulated motorcycle parts on a bicycle to make it appear to be a motorcycle is well known in the prior art. Such attachments for bicycles simulate the features of motorcycle fuel tanks, motors, fenders, controls and the like so that a child can have the excitement of having his bicycle appear to be more like an adult motorcycle. U.S. Pat. No. 5,505,493 to Camfield et al depicts a bicycle with simulated motorcycle parts made of solid plastic which dress up a bicycle to make it appear to be a motorcycle.

SUMMARY OF THE INVENTION

It is an object of this invention to provide a new bicycle accessory in the form of an inflatable simulated fuel tank made of a flexible plastic material in the shape of a motorcycle fuel tank which structure can be inflated and then attached to a bicycle's top tube member.

It is a further object of this invention to provide an inflatable simulated fuel tank structure which is substantially lower in cost to produce and market compared to a simulated fuel tank made of hard plastic and one which can more easily be provided in a variety of styles to imitate desired motorcycle fuel tanks and which can bear imprinting thereon in a variety of decorative styles, such as having flames or licensed trademarks which will make a bicycle with such a simulated fuel tank much more interesting to its owner and admirers. The simulated fuel tank can be sold in a small package in its deflated mode, thus realizing savings in packaging and shipping. The inflatable simulated fuel tank of this invention has attachment members and an elongated top tube receipt channel defined in the bottom of the inflatable structure such that it can be removably attached on the top tube of a bicycle between the seat post and the handlebar stem. The simulated fuel tank of this invention can have an imitation filler cap provided at its front and means to add air, such as an air inlet, can be provided.

To install the device of this invention the user would first blow air into the air inlet or have air from an air supply pass through the air inlet to fully inflate the simulated fuel, and the air inlet would then be closed and sealed. The simulated fuel tank would then be attached to the top tube of the bicycle by attachment means, as described in further detail below.

DESCRIPTION OF THE PREFERRED EMBODIMENT(S)

Figure 1:
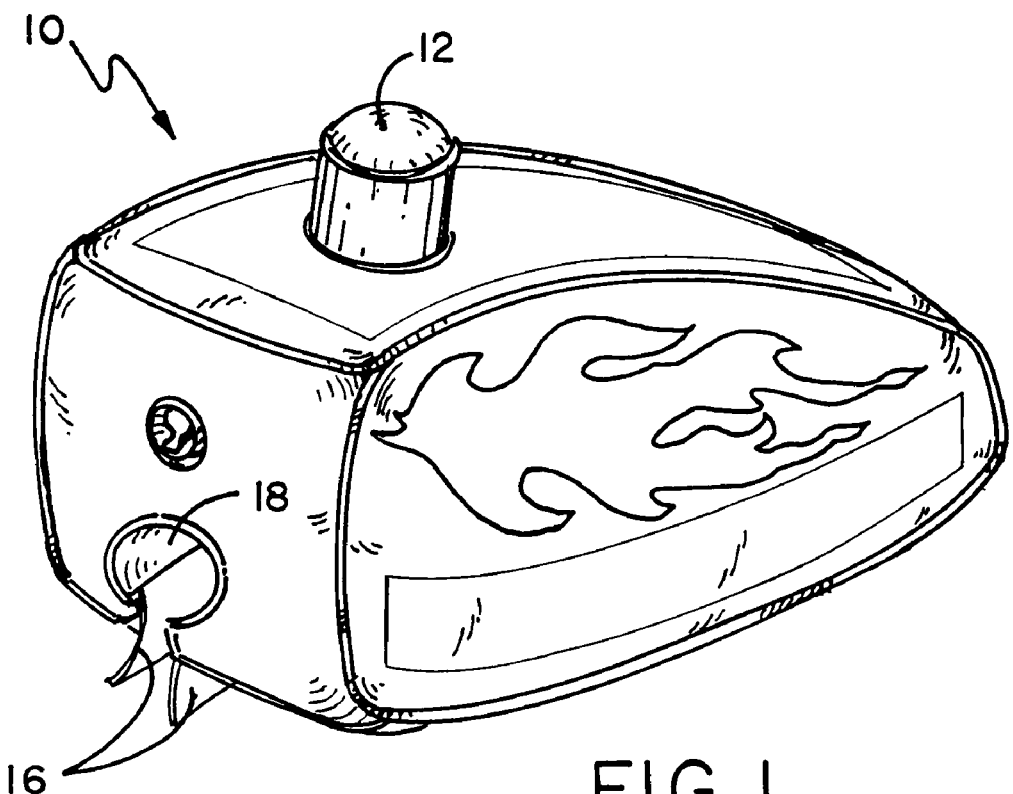
FIG. 1 illustrates a perspective view of the simulated fuel tank of this invention in its inflated mode.
Figure 2:
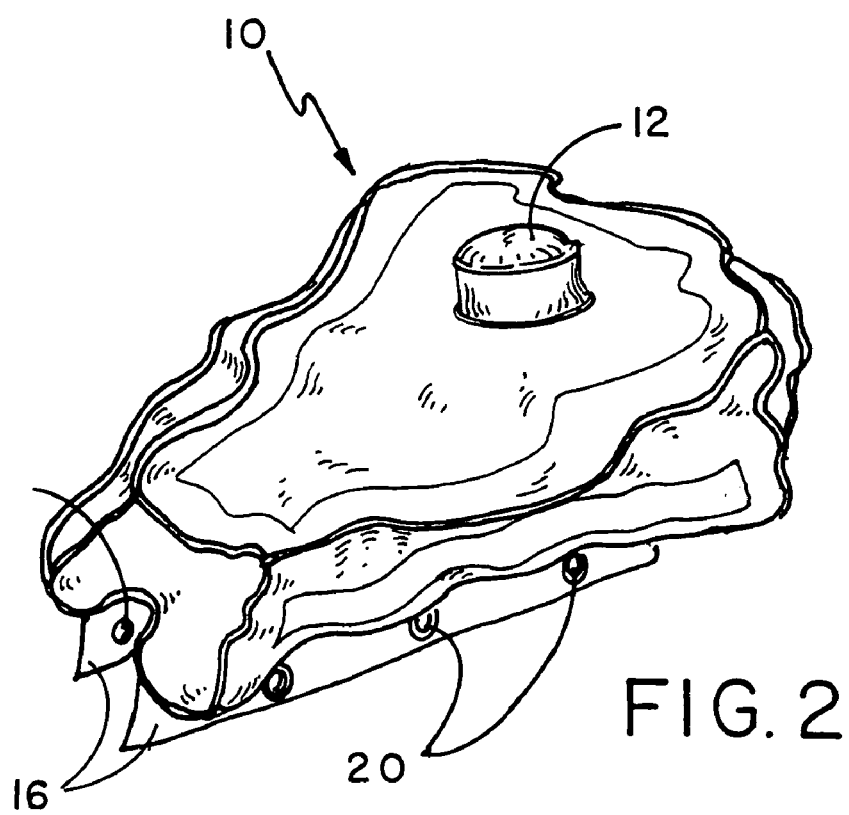
FIG. 2 illustrates a perspective view of the simulated fuel tank of this in its deflated mode.
Figure 3:
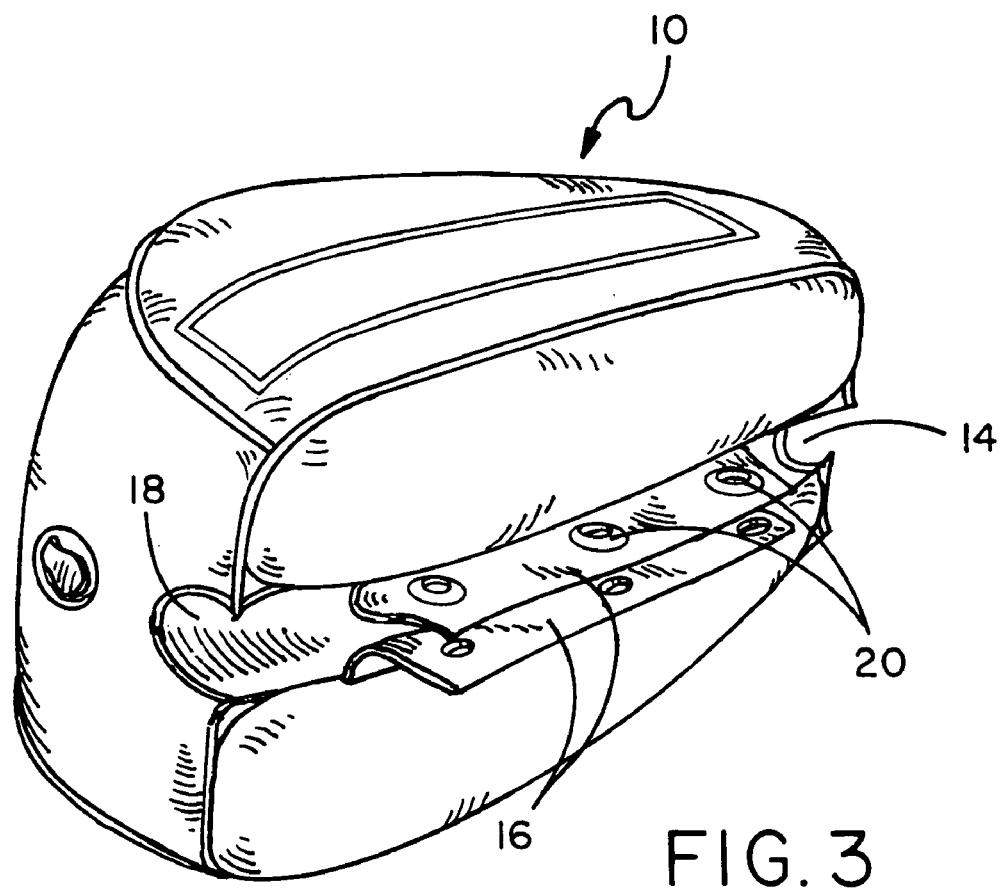
FIG. 3 illustrates a bottom perspective view of the simulated fuel tank showing its top tube receipt channel and mating attachment members.
Figure 4:
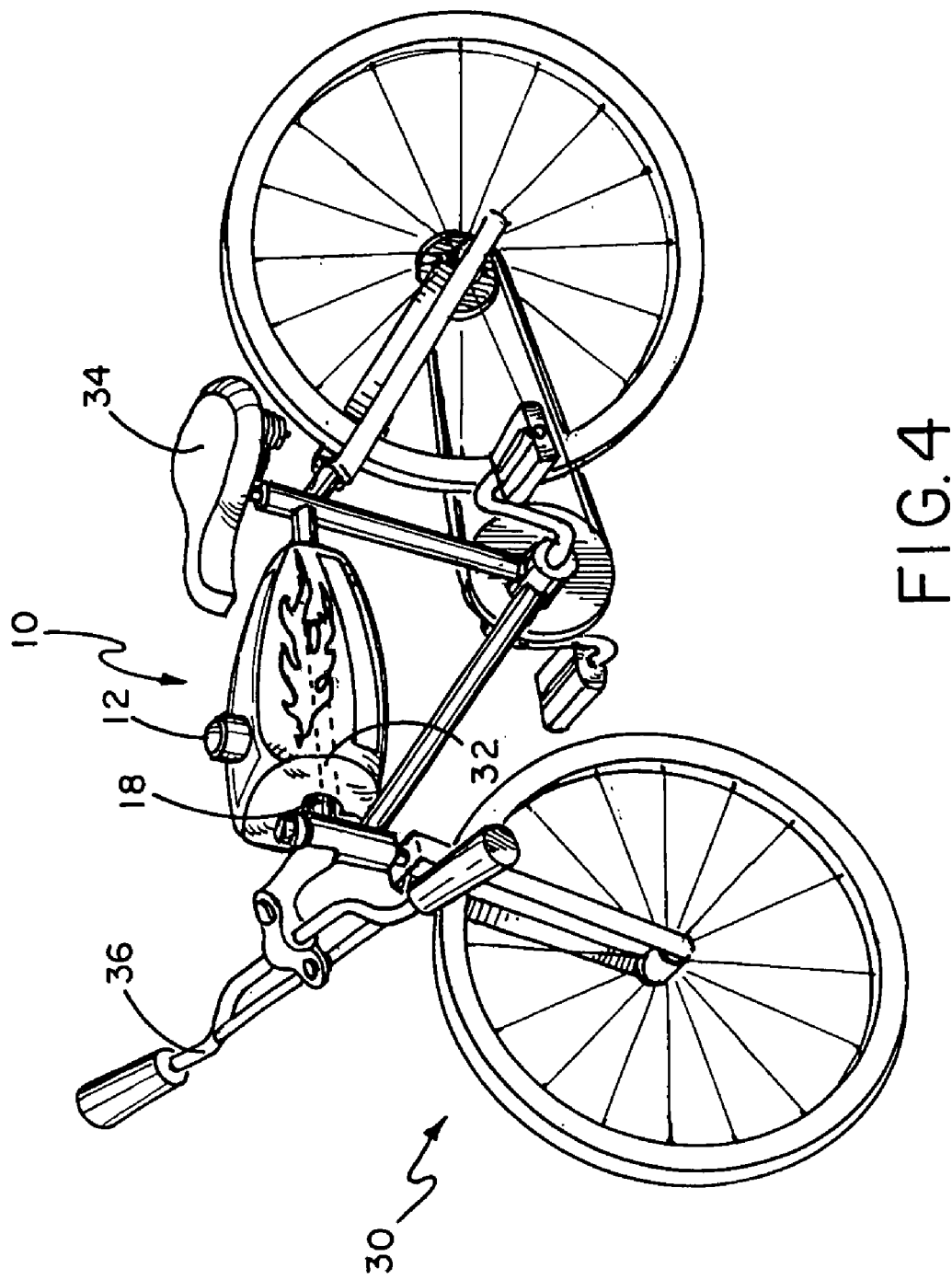
FIG. 4 illustrates a perspective view of a bicycle showing the simulated fuel tank of this invention installed thereon.

FIG. 2 illustrates a perspective view of inflatable simulated fuel tank 10 in its deflated mode. Also seen in FIG. 2 are simulated filler cap 12 and air inlet 14. In use, one would pass air through air inlet 14 and when simulated fuel tank 10 was fully inflated, air inlet 14 would be closed and sealed. The fully inflated simulated fuel tank 10, as seen in FIG. 1, is ready for installation on bicycle 30. In FIG. 4 one can see that top tube 32 has been passed into the top tube receipt channel 18 which channel is U-shaped in cross-section which is best seen in FIG. 3. Top tube receipt channel 18 extends along the bottom of simulated fuel tank 10. On either side of top tube receipt channel 18 are first and second attachment members 16 which, in one embodiment, can have a plurality of mating snap attachments 20 such that when top tube receipt channel 18 of simulated fuel tank 10 is placed on top tube 32 between seat 34 and handle bars 36, the snap attachments 20 can be engaged with their mating members to hold attachment members 16 together around top tube 32 of the bicycle.

It should be noted that the inflatable simulated fuel tank of this invention can take many different shapes and sizes depending on the structure and shape of the plastic that forms its inflatable body to simulate many different types and styles of motorcycle fuel tanks. The filler cap can be positioned in different locations on the structure as copied from actual motorcycle fuel tanks, and it should not be considered fixed in the position as illustrated since the simulated fuel tank of this invention can have many different configurations other than that illustrated.

The simulated fuel tank of this invention can be made from well-known methods of manufacture of three-dimensional inflatable structures. It should further be understood that other methods of attachment of the simulated fuel tank of this invention to a bicycle can be used other than that illustrated.

It should further be noted that there is a safety advantage obtained to utilizing the simulated fuel tank of this invention over that of the prior art. Should a rider fall onto the simulated fuel tank of this invention much less injury would be suffered by the rider since the inflated simulated fuel tank is soft and compressible whereas the prior art simulated fuel tanks are made of hard, rigid plastic.

It should also be noted that the simulated fuel tank of this invention can be provided with decorations thereon including imprinted decorations and/or decals and other indicia such as licensed logos from motorcycle manufacturers to emulate the style and markings that appear on actual motorcycle fuel tanks.

Although the present invention has been described with reference to particular embodiments, it will be apparent to those skilled in the art that variations and modifications can be substituted therefor without departing from the principles and spirit of the invention.

I claim:

1. An accessory for a bicycle having a top tube, comprising:
    an inflatable flexible plastic a motorcycle fuel tank, said inflatable plastic tank having a bottom; and
    means for attaching said inflatable plastic tank to said top tube of said bicycle, said means disposed on said bottom of said inflatable plastic tank.

2. The accessory of claim 1 wherein said means for attaching said inflatable plastic tank to said top tube further includes a top tube receipt channel defined in said bottom of said inflatable plastic tank for receipt of said top tube therein.

3. The accessory of claim 2 wherein said means for attaching said inflatable plastic tank to said top tube of said bicycle further includes first and second attachment members positioned on either side of said top tube receipt channel for engagement to one another when said top tube is positioned in said top tube receipt channel.

4. The accessory of claim 3 wherein said inflatable plastic tank can be formed in a variety of shapes selected to simulate one of a variety of actual motorcycle fuel tanks.

5. The accessory of claim 4 further including a simulated filler cap positioned on said inflatable plastic tank.

* * * * *